Dec. 31, 1929.  J. F. O'CONNOR  1,741,648
FRICTION SHOCK ABSORBING MECHANISM
Filed Jan. 27, 1927  2 Sheets-Sheet 2
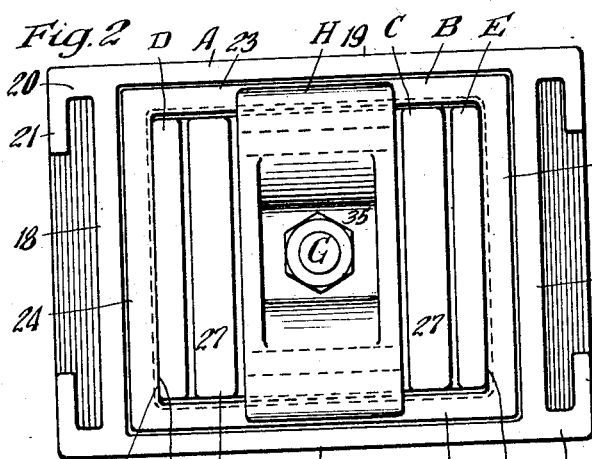
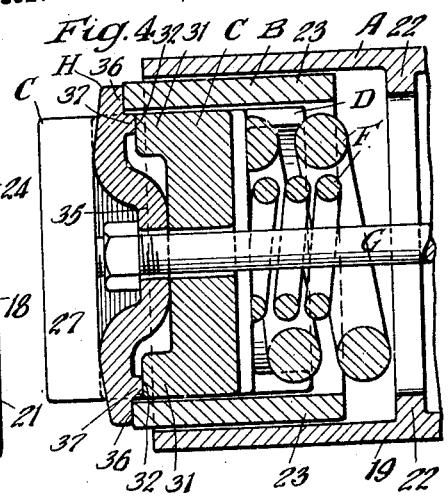
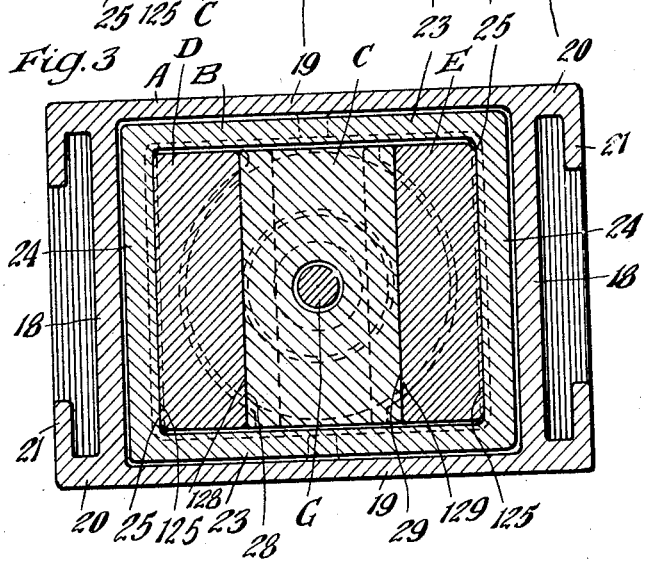
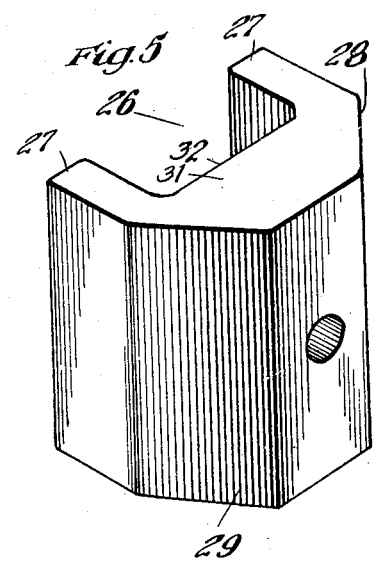
Witness
Wm. Geiger
Inventor
John F. O'Connor
By George I Haight
His Atty.

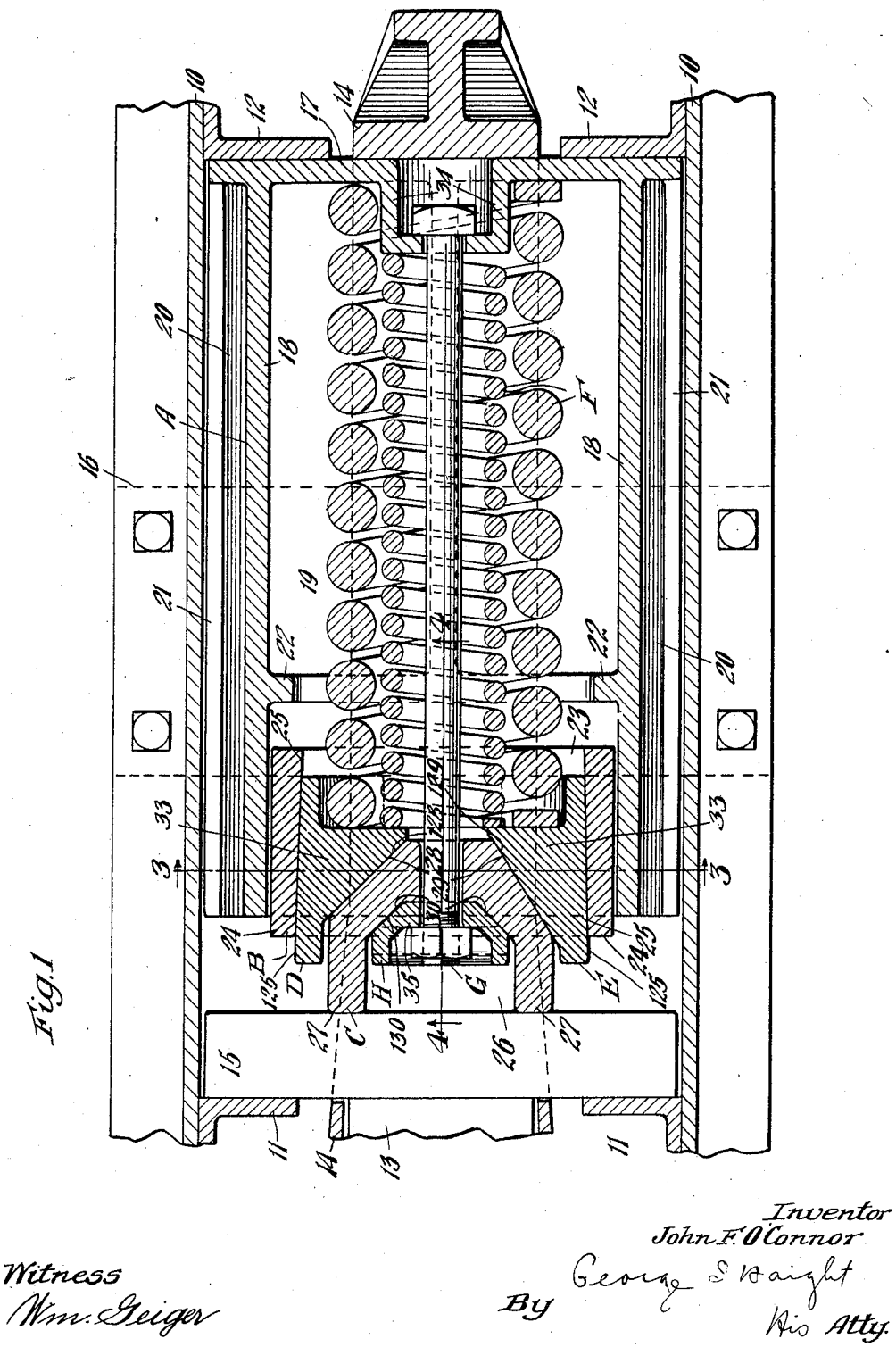

Patented Dec. 31, 1929

1,741,648

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK-ABSORBING MECHANISM

Application filed January 27, 1927. Serial No. 164,012.

This invention relates to improvements in friction shock-absorbing mechanisms.

One object of the invention is to provide a friction shock absorbing mechanism of simple design, especially adapted for railway draft riggings, including a spring cage and a friction shell having limited relative movement to provide for initial light resistance, wherein the friction shell is so designed as to be readily removable so as to re-place a worn-out shell by a new one when desired.

Another object of the invention is to provide a friction shock absorbing mechanism of the character indicated, including a spring cage and a relatively movable friction shell together with a friction wedge system co-operating with the shell, wherein simple and efficient retaining means, common to both the friction shell and friction system, is employed to limit outward movement of the same with respect to the cage.

A still further object of the invention is to provide a mechanism of the character indicated, including a rectangular spring cage having a rectangular friction shell telescoped therewithin, the shell having limited movement with respect to the cage, and a friction wedge system co-operating with the shell, wherein the wedge member of the friction system and the friction shell are retained against outward movement with respect to the cage by a clamping element anchored to the usual retainer bolt employed to hold the parts of the shock absorbing mechanism assembled.

Another object of the invention is to provide in a mechanism of the character indicated, including a rectangular spring cage, means for centering the cage between the draft sills of the railway draft rigging to prevent angular displacement of the cage, comprising top and bottom flanges on opposite sides of the cage having relatively large surfaces adapted to co-operate with the draft sills.

Other objects and advantages of the invention will more fully and clearly appear from the description and claims hereinafter following.

In the drawings, forming a part of this specification, Figure 1 is a horizontal, longitudinal, sectional view of a railway draft rigging showing my improvements in connection therewith. Figure 2 is a front end elevational view of the shock absorbing mechanism proper. Figure 3 is a vertical, transverse, sectional view corresponding substantially to the line 3—3 of Figure 1. Figure 4 is a longitudinal, vertical, sectional view of the front end of the shock absorbing mechanism shown in Figure 1, corresponding substantially to the line 4—4 of said figure. And Figure 5 is a detailed, perspective view of the wedge block employed in connection with my improved shock absorbing mechanism.

In said drawings, 10—10 indicate channel-shaped center or draft sills of a railway draft rigging, to the inner surfaces of which are secured the usual front stop lugs 11—11 and rear stop lugs 12—12. The inner end of the drawbar is designated by 13, to which is operatively connected a yoke 14 of usual form. The shock absorbing mechanism proper, as well as a front main follower 15 are disposed within the yoke, and the yoke and the parts therewithin are maintained in operative position by a detachable saddle plate 16 fixed to the draft sills.

My improved shock absorbing mechanism proper comprises broadly: a spring cage A; a friction shell B; a wedge block C; a pair of friction shoes D and E; a main spring resistance F; a retainer bolt G; and a retaining clamp H.

The spring cage A is of substantially rectangular box-like form and has a transverse vertically disposed rear end wall 17 adapted to co-operate with the stop lugs 12 in the manner of the usual rear follower. The cage is also provided with longitudinally extending spaced vertical side walls 18—18 and horizontally disposed longitudinally extending spaced top and bottom walls 19—19. As most clearly shown in Figure 1, the cage A is of such a length and has the front end thereof spaced with relation to the main follower 15 so that when the mechanism is fully compressed, the follower will directly engage the front end of the cage to limit relative movement of the parts, the cage acting as a stop column to transmit the load to the stop lugs on the draft sills. In order to center the cage between the draft sills and reinforce the same, the top and bottom walls 19 are laterally extended to provide horizontally disposed top and bottom flanges 20—20 and the flanges 20 are provided with downturned sections 21 parallel to the surfaces of the draft sills and adapted to form extended bearing surfaces on the cage A. Inwardly of the front end, the cage is provided with laterally projecting ribs 22 on the top, bottom and side walls thereof, the ribs 22 serving as limiting stop means for the friction shell B.

The friction shell B is in the form of a substantially rectangular casting open at its opposite ends and having horizontally disposed spaced top and bottom walls 23—23 and vertically disposed longitudinally extending spaced side walls 24—24. The side walls 24 are provided with friction surfaces 25, the surfaces 25 converging inwardly of the mechanism.

The spring cage A and friction shell B may be made of any suitable material. However, I preferably construct the cage A of steel and form the friction shell of malleable iron.

It will be noted that the friction shell is of the same uniform external cross-section throughout and loosely fits the spring cage. By this arrangement, the friction shell is telescoped entirely within the spring cage when limited in its inward movement by the stops 22.

The wedge block C is vertically slotted as indicated at 26 to receive the retaining element or clamp H hereinafter more fully described. By providing the wedge with a vertical slot 26, side arms 27—27 are provided which have flat outer ends adapted to bear directly on the inner surface of the main follower 15. At the inner end, the wedge block C is provided with a pair of inwardly converging wedge faces 28 and 29, the wedge face 28 being preferably disposed at a relatively blunt releasing angle and the wedge face 29 being disposed at a substantially keen wedge acting angle with respect to the longitudinal axis of the mechanism. Although the wedge faces 28 and 29 are shown as extending at different angles with respect to the longitudinal axis of the mechanism, it is within my invention to provide wedge faces extending at the same angle with respect to said axis. At the inner ends of the arms 27, the main body portion of the wedge block C is cut away as most clearly shown in Figures 1 and 4 to provide inwardly converging bearing faces 30—30 adapted to co-operate with the clamp or retaining element H. The main body portion of the wedge block C is provided with top and bottom ribs or flanges 31 overhanging the cut away portion, the ribs or flanges having flat transverse outer abutment faces 32 adapted to co-operate with the retaining clamp as hereinafter pointed out.

The friction shoes D and E are two in number and are disposed at opposite sides of the mechanism, being interposed between the wedge block C and the side walls 24 of the friction shell. The shoes D and E are of the same design except as hereinafter pointed out. Each shoe is provided with a flat outer friction surface 125 adapted to co-operate with the corresponding friction surface 25 of the shell B. On the inner side, each shoe is provided with a lateral enlargement 33 having a wedge face at the forward side thereof. The wedge face of the shoe E is designated by 129 and is correspondingly inclined to the wedge face 29 of the block C and co-operates therewith. The wedge face of the shoe D is designated by 128 and is disposed at a blunt angle with respect to the longitudinal axis of the mechanism and co-operates with the blunt face 28 of the wedge block C. The main spring resistance F comprises a relatively light inner coil and a relatively heavier outer coil. Both of the coils of the spring resistance have their front ends bearing on the inner ends of the enlargements 33 of the friction shoes and the outer coil has the rear end thereof bearing directly on the end wall 17 of the spring cage A. The rear end of the inner coil bears on a hollow boss 34 inwardly extending from the end wall 17 of the cage.

The mechanism is held assembled by the retainer bolt G which has the head thereof anchored within the hollow boss 34 and has the shank thereof extending through an opening in the wedge block C.

The retaining element or clamp H is in the form of a bar having a centrally off-set section 35 provided with inclined side faces 130—130 adapted to bear on the faces 30 of the wedge block C. The bar is also provided with a central opening adapted to receive the front end of the retainer bolt G and the nut of the bolt is seated within the off-set central section of the bar. It will be evident that the retaining bar or clamp H is thus anchored to the cage A by the retainer bolt G. The bar forming the retaining element H is provided with pairs of shoulders 36 and 37 at the top and bottom ends thereof, the shoulders 37 being inwardly offset with respect to the shoulders 36, bearing on the abutment faces 32 at the top and bottom of the wedge block C, thereby limiting outward movement of the wedge block. Outward movement of the wedge block C is also limited by engagement of the offset section 35 of the retaining element H and the inclined side faces thereof with the body portion of the wedge block C. The shoulders 36 of the retaining element co-operate with the outer ends of the top and bottom walls 23 of the friction shell, thus positively limiting the outward movement of the shell.

In the operation of my improved shock absorbing mechanism during a compression stroke, the spring cage A and main follower 15 will be moved relatively toward each other, thereby forcing the wedge block C inwardly of the spring cage, carrying the friction shoes D and E therewith and also forcing the same laterally into tight frictional engagement with the friction surfaces of the friction shell B. Due to the friction between the shoes and the shell B, the latter will initially be carried inwardly in unison with the shoes and wedge block against the resistance of the main spring F, the pressure being transmitted through the shoes to the spring resistance. This action will continue until the inner end of the friction shell comes into engagement with the ribs 22, thereby positively arresting movement of the shell and forcing the friction shoes to move inwardly with respect to the shell during the remainder of the compression stroke of the mechanism, thereby greatly augmenting the resistance offered. The compression of the mechanism will continue either until the actuating force is reduced or until the main follower is limited in its movement by engagement with the front end of the spring cage. In release, when the actuating pressure is reduced, the expansive action of the main spring resistance will force the friction shoes and wedge member outwardly of the spring cage, the friction shell B being carried therewith, due to the friction existing between the shoes and the shell. Outward movement of the shell will be positively limited by engagement with the stop element or bar H which is anchored to the retainer bolt. The friction shoes and wedge block will then be forced to move outwardly with respect to the shell B until the wedge block C is limited by engagement with the retaining element H.

The retainer bolt is so adjusted as to maintain the spring resistance F under initial compression, thereby providing compensation for wear of the various friction and wedge faces of the mechanism.

From the preceding description taken in connection with the drawings, it will be evident that I have provided a shock absorbing mechanism of the movable friction shell type, wherein the friction shell is of exceedingly simple construction and may be readily replaced by a new shell when the same becomes worn. It will further be evident that as the friction shell is of simple box-like form, open at its opposite ends, it may be cheaply and economically manufactured, requiring only simple operations in its construction.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a spring cage; of a friction shell, said shell and cage being relatively movable to an extent longitudinally of the mechanism less than the full compression stroke; a plurality of shoes having frictional engagement with the shell; spring resistance means opposing movement of the shoes; a wedge member co-operating with the shoes; and a retaining means anchored to the cage and engaging with the wedge and shell for limiting outward movement of the wedge and shell.

2. In a friction shock absorbing mechanism, the combination with a spring cage; of a friction shell having movement longitudinally of the cage during a part only of the compression stroke of the mechanism; a friction system co-operating with the shell, said system including a spreading means; spring resistance means yieldingly opposing movement of said friction system inwardly of the mechanism; a retaining element having separate engagement with the spreading means and shell for independently limiting outward movement of the spreading means and shell with respect to the cage; and means for anchoring said retaining means to the cage.

3. In a friction shock absorbing mechanism, the combination with a spring cage; of a friction shell telescoped within said cage, said shell and cage being relatively movable longitudinally of the mechanism; means on the cage for arresting inward movement of the shell after a predetermined partial compression of the mechanism; friction shoes co-operating with the shell; spring means opposing movement of the shoes inwardly of the shell; a wedge member co-operating with the shoes; and a retaining clamp anchored to the cage and having means thereon for limiting outward movement of the shell and wedge member with respect to the cage.

4. In a friction shock absorbing mechanism, the combination with a spring cage; of a rectangular friction shell telescoped within the spring cage, said shell having opposed friction surfaces; means on the cage for limiting inward movement of the shell after a partial compression of the mechanism; a pair of friction shoes co-operating with said opposed surfaces; a wedge block co-operating with said shoes; a retaining element engageable with the wedge block and shell for limiting outward movement thereof; and means for anchoring said retaining element to the cage.

5. In a friction shock absorbing mechanism, the combination with a rectangular spring cage; of a rectangular friction shell telescoped within the cage; abutment shoulders on the cage for limiting inward movement of the shell after partial compression of the mechanism; friction shoes co-operating with the shell; a wedge block co-operating with the shoes; spring means opposing relative movement of the shell and shoes inwardly of the mechanism; a retainer bolt anchored to the cage; and a clamp element anchored to the retainer bolt, said clamp element having abutment means thereon for limiting outward movement of the shell.

In witness that I claim the foregoing I have hereunto subscribed my name this 24th day of January, 1927.

JOHN F. O'CONNOR.